United States Patent [19]

Ramey et al.

[11] 3,992,351

[45] Nov. 16, 1976

[54] ALKYL ALKANOATE DERIVATIVES OF SUBSTITUTED PIPERAZINES AND POLYMER COMPOSITIONS STABILIZED THEREBY

[75] Inventors: Chester E. Ramey, Spring Valley; John J. Luzzi, Carmel, both of N.Y.

[73] Assignee: Ciba-Geigy Corporation, Ardsley, N.Y.

[22] Filed: May 30, 1975

[21] Appl. No.: 582,563

Related U.S. Application Data

[60] Division of Ser. No. 332,839, Feb. 15, 1973, Pat. No. 3,899,491, which is a continuation-in-part of Ser. No. 239,350, March 29, 1972, abandoned.

[52] U.S. Cl. .................... 260/45.8 N; 260/45.8 NT; 260/45.85 B; 260/45.95 D
[51] Int. Cl.² .......................................... C08K 5/34
[58] Field of Search .............................. 260/45.8 N

[56] References Cited
UNITED STATES PATENTS

| | | |
|---|---|---|
| 3,318,876 | 5/1967 | Cignarella et al. .................. 260/240 |
| 3,547,875 | 12/1970 | Bonkowski ........................ 260/45.8 |
| 3,681,358 | 8/1972 | Kleiner .............................. 260/268 |
| 3,865,826 | 2/1975 | Schwartz et al. ................. 260/247.5 |

*Primary Examiner*—Donald E. Czaja
*Assistant Examiner*—R. A. White
*Attorney, Agent, or Firm*—Charles W. Vanecek

[57] ABSTRACT

Alkyl alkanoate derivatives of substituted piperazines are stabilizers for synthetic polymeric materials normally subject to deterioration caused by ultraviolet light. The compounds may be formed by reacting a substituted piperazine with an acrylate or reacting a substituted piperazine with an α-haloalkanoate. Polymeric compositions containing these stabilizers may also contain a hindered phenolic compound. A typical embodiment is n-octadecyl-β-(15{7,15-diazadispiro[5,1,5,3]hexadecane}propionate.

21 Claims, No Drawings

ALKYL ALKANOATE DERIVATIVES OF SUBSTITUTED PIPERAZINES AND POLYMER COMPOSITIONS STABILIZED THEREBY

This application is a divisional of application Ser. No. 332,839, filed Feb. 15, 1973, now U.S. Pat. No. 3,899,491, which is a continuation-in-part of application Ser. No. 239,350, filed Mar. 29, 1972, now abandoned.

BACKGROUND OF THE INVENTION

This invention relates to the stabilization of organic material normally tending to deteriorate. In particular, the invention relates to the protection of synthetic polymers against the harmful degradative effects, such as discoloration and embrittlement caused by exposure to light, especially ultraviolet light.

It is known that actinic radiation, particularly in the near ultraviolet region, has a deleterious effect on both the appearance and properties of organic polymers. For example, normally colorless or light colored polyesters yellow on exposure to sunlight as do such cellulosics as cellulose acetate. Polystyrene discolors and cracks, with accompanying loss of its desirable physical properties when exposed to actinic light, while vinyl resins, such as polyvinyl chloride and polyvinyl acetate spot and degrade. The rate of air oxidation of polyolefins such as polyethylene and polypropylene is materially accelerated by ultraviolet light.

It has been proposed to stabilize polymeric materials against ultraviolet light deterioration by the use of various types of ultraviolet absorbers. Thus, in U.S. Pat. No. 3,004,896, discloses for this purpose 2(2-hydroxyphenyl)benzotriazole derivatives, while U.S. Pat. No. 3,189,630 discloses certain metal salts of hydroxybenzoic acids which are useful as actinic stabilizers in synthetic polymers.

DETAILED DISCLOSURE

The present invention is directed to a class of ultraviolet light stabilizers which consist of a compound of the formula

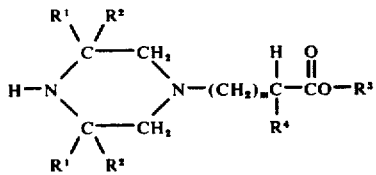

wherein $R^1$ and $R^2$ are methyl or together with the carbon to which they are bound form a mono-cyclic ring system having 5 or 6 carbon atoms;

$R^3$ is an alkyl group of from 1 to 20 carbon atoms;

$R^4$ is hydrogen or methyl, and m is 0 or 1.

Illustrative examples of the alkyl group as represented by $R^3$ include both branched and straight chained hydrocarbons such as methyl, ethyl, propyl, isopropyl, butyl, pentyl, isopentyl, hexyl, octyl, dodecyl, tetradecyl, hexadecyl, octadecyl, eicosyl and the like. The preferred alkyl group contains from 6 to 18 carbon atoms. The monocyclic ring system or cycloalkyl group containing 5 or 6 carbon atoms include cyclopentyl and cyclohexyl.

This invention also relates to compositions of matter which are stabilized against ultraviolet light deterioration which comprises a synthetic organic polymer normally subject to ultraviolet deterioration containing from about 0.005 to 5 percent by weight of the polymer of the compounds of formula I and preferably from 0.01 to 2 percent by weight.

Alkyl alkanoate derivatives of the substituted piperazine as represented by formula I can be used in combination with other light stabilizers such as 2(2-hydroxyphenyl)benzotriazoles, 2-hydroxybenzophenones, nickel complexes and benzoates.

The stabilizers of this invention are suitable for the protection of many synthetic polymers from the deleterious effects of light. Homopolymers, copolymers, and mixtures thereof are embraced within the scope of substrates which may be stabilized with the stabilizers of this invention, along which may be mentioned, polystyrene and including homopolystyrene and copolymers with acrylonitrile and/or butadiene; vinyl resins formed from the polymerization of vinyl halides of from copolymerization of vinyl halides with unsaturated polymerizable compounds, for example, vinyl esters, $\alpha$, $\beta$-unsaturated acids, $\alpha,\beta$-unsaturated esters, and unsaturated hydrocarbons such as butadienes and styrene; poly-$\alpha$-olefins such as high and low density polyethylene, cross-linked polyethylene, polypropylene, poly(4-methyl-pentene-1) polybutene-1, and the like including copolymers of poly-$\alpha$-olefins such as ethylene-propylene copolymers, and the like; polybutadiene; polyisoprene; polyurethanes such as are prepared from polyols and organic polyisocyanate; polyamides such as hexamethylene-adipamide; polyesters such as polymethyleneterephthalates; polycarbonates such as those prepared from bisphenol-A and phosgene; polyacetals; polyethylene oxide; and polyacrylics such as polyacrylonitrile; polyphenyleneoxides such as those prepared from 2,6-dimethylphenol and the like. Particularly preferred polymers for the compositions of this invention are those normally solid polymers of alpha-olefins having up to 3 carbon atoms, e.g., ethylene-propylene and their copolymers.

The stabilized polymers of the present invention have utility in the normal uses for which plastics are employed and particularly useful for film and fiber. Compounds of this invention may be incorporated in the polymeric substance during the usual processing operations, for example, by hot milling, the composition then being extruded, pressed, blow molded or the like into films, fibers, filaments, hollow spheres and the like. Where the polymer is prepared from a liquid monomer as in the case of styrene, the stabilizer may be dispersed or dissolved in the monomer prior to polymerization or curing.

In addition to the actinic stabilizers described, the plastic compositions may contain other additives such as plasticizers, pigments, fillers, dyes, glass or other fibers, thermal antioxidants, and the like. For example in most applications, it is desirable to incorporate into the resin composition, sufficient thermal antioxidants to protect the plastic against thermal and oxidative degradation. The amount of antioxidant required will be comparable to that of the actinic stabilizer. Namely, from about 0.005 to 5 percent and preferably from 0.01 to 2 percent by weight. Representative of such antioxidants are phosphite esters, such as triphenylphosphite and dibutylphosphite and alkyl arylphosphites such as dibutylphenylphosphite, and the like.

The best results are obtained with the preferred class of thermal antioxidants, the hindered phenols. These compounds have been found to provide the best thermal stabilization with the least discoloration in the compositions of the invention. Typical of these phenolic antioxidants include the following:

1. Phenolic compounds having the general formula

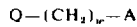
Q—(CH₂)ᵤᵥ—A wherein
Q is

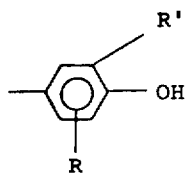

A is CR(COOR'')₂

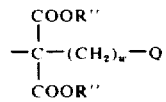

R is hydrogen or lower alkyl
R' is lower alkyl
R'' is alkyl group having from 6 – 24 carbon atoms
w is an integer from 0 to 4.

Illustrative examples of the compounds shown above are
di-n-octadecyl α-(3,5-di-t-butyl-4-hydroxybenzyl)-malonate
di-n-octadecyl α-(3-t-butyl-4-hydroxy-5-methyl-benzyl)malonate which is disclosed in the Netherlands Pat. No. 6,711,199, Feb. 19, 1968
di-n-octadecyl-α,α'-bis-(3-t-butyl-4-hydroxy-4-methylbenzyl)malonate which is disclosed in the Netherlands Pat. No. 6,803,498, Sept. 18, 1968.

2. Phenolic compounds having the general formula

Q-R

Illustrative examples of the compounds shown above are
2,6-di-t-butyl-p-cresol  2-methyl-4,6-di-t-butylphenol
and the like.

3. Phenolic compounds having the formula

Q-C₂H₂ᵤᵥ-Q 2,2'-methylene-bis(6-t-butyl-4-methylphenol)
2,2'-methylene-bis(6-t-butyl-4-ethylphenol)
4,4'-butylidene-bis(2,6-di-t-butylphenol)
4,4'-(2-butylidene)-bis(2-t-butyl-5-methylphenol)
2,2'-methylene-bis{6-(1-methylcyclohexyl)-4-methylphenol} and the like.

4. Phenolic compounds having the formula

R-O-Q

Illustrative examples of such compounds are
2,5-di-t-butylhydroquinone
2,6-di-t-butylhydroquinone
2,5-di-t-butyl-4-hydroxyanisole 5. Phenolic compounds having the formula

Q-S-Q

Illustrative examples of such compounds are
4,4'-thiobis-(2-t-butyl-5-methylphenol)
4,4'-thiobis-(2-t-butyl-6-methylphenol)
2,2'-thiobis-(6-t-butyl-4-methylphenol)

6. Phenolic compounds having the formula

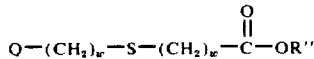

Illustrative examples of such compounds are octadecyl-(3,5-dimethyl-4-hydroxybenzylthio)-acetate
dodecyl-(3,5-di-t-butyl-4-hydroxybenzylthio)-propionate 7. Phenolic compounds having the formula

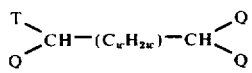

wherein T is R or Q as defined above.

Illustrative examples of such compounds are
1,1,3-tris(3,5-dimethyl-4-hydroxyphenyl)-propane
1,1,3-tris(5-t-butyl-4-hydroxy-2-methylphenyl)-butane
1,1,5,5-tetrakis-(3'-t-butyl-4'-hydromethylphenyl)-n-pentane 8. Phenolic compounds having the formula

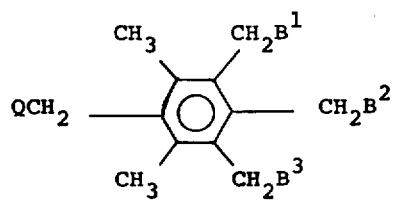

wherein B¹, B² and B³ are hydrogen, methyl or Q, provided that when B¹ and B³ are Q then B² is hydrogen or methyl and when B² is Q then B¹ and B³ are hydrogen or methyl.

Illustrative examples of such compounds are
1,4-di(3,5-di-t-butyl-4-hydroxybenzyl)-2,3,5,6-tetramethylbenzene
1,3,5-tri(3,5-di-t-butyl-4-hydroxybenzyl)-2,4,6-trimethylbenzene 9. Phenolic compounds having the formula

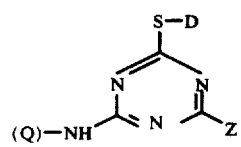

wherein Z is NHQ, —S-D or —O-Q
D is alkyl group having from 6 – 12 carbon atoms or -(CᵤH₂ᵥ)-S-R''.

Illustrative examples of such compounds are 2,4-bis-(n-octylthio)-6-(3,5-di-t-butyl-4-hydroxyaniline)-1,3,5-triazine
6-(4-hydroxy-3-methyl-5-t-butylanilino)-2,4-bis-(n-octylthio)-1,3,5-triazine
6-(4-hydroxy-3,5-dimethylanilino)-2,4-bis-(n-octylthio)-1,3,5-triazine
6-(4-hydroxy-3,5-di-t-butylanilino)-2,4-bis-(n-octylthioethylthio)-1,3,5-triazine
6-(4-hydroxy-3,5-di-t-butylanilino)-4-(4-hydroxy-3,5-di-t-butylphenoxy)-2-(n-octylthio)-1,3,5-triazine
2,4-bis(4-hydroxy-3,5-di-t-butylanilino)-6-(n-octylthio)-1,3,5-triazine.

The above phenolic triazine stabilizers are more fully described in U.S. Pat. No. 3,255,191.

10. Phenolic compounds having the formula

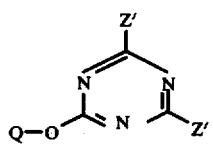

wherein Z' is -O-Q, -S-D or -S-(C$_w$H$_{2w}$)-SD

Illustrative examples of such compounds are
2,3-bis-(3,5-di-t-butyl-4-hydroxyphenoxy)-6-(n-octylthio)-1,3,5-triazine
2,4,6-tris-(4-hydroxy-3,5-di-t-butylphenoxy)-1,3,5-triazine.
6-(4-hydroxy-3,5-di-t-butylphenoxy)-2,4-bis-(n-octylthioethylthio)-1,3,5-triazine
6-(4-hydroxy-3-methylphenoxy)-2,4-bis-(n-octylthio)-1,3,5-triazine
6-(4-hydroxy-3-t-butylphenoxy)-2,4-bis-(n-octylthioethylthio)-1,3,5-triazine
6-(4-hydroxy-3-methyl-5-t-butylphenoxy)-2,4-bis-(n-octylthio)-1,3,5-triazine
2,4-bis-(4-hydroxy-3-methyl-5-t-butylphenoxy)-6-(n-octylthio)-1,3,5-triazine
2,4,6-tris-(4-hydroxy-3-methyl-5-t-butylphenoxy)-1,3,5-triazine
6-(4-hydroxy-3,5-di-t-butylphenoxy)-2,4-bis-(n-octylthiopropylthio)-1,3,5-triazine
6-(4-hydroxy-3,5-di-t-butylphenoxy)-2,4-bis-(n-dodecylthioethylthio)-1,3,5-triazine
2,4-bis-(4-hydroxy-3,5-di-t-butylphenoxy)-6-butylthio-1,3,5-triazine
2,4-bis-(4-hydroxy-3,5-di-t-butylphenoxy)-6-(n-octadecylthio)-1,3,5-triazine
2,4-bis-(4-hydroxy-3,5-di-t-butylphenoxy)-6-(n-dodecylthio)-1,3,5-triazine
2,4-bis-(4-hydroxy-3,5-di-t-butylphenoxy)-6-(n-octylthiopropylthio)-1,3,5-triazine
2,4-bis-(4-hydroxy-3,5-di-t-butylphenoxy)-6-(n-octylthioethylthio)-1,3,5triazine
2,4-bis-(4-hydroxy-3,5-di-t-butylphenoxy)-6-(n-dodecylthioethylthio)-1,3,5-triazine.

The above phenolic triazine stabilizers are more fully described in U.S. Pat. No. 3,255,191.

11. Phenolic compounds having the formula

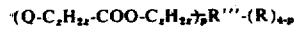

wherein p is an integer from 2 to 4 and R''' is a tetravalent radical selected from aliphatic hydrocarbons having from 1 to 30 carbon atoms aliphatic mono and dithioethers having from 1 to 30 carbon atoms
aliphatic mono and diethers having from 1 to 30 carbon atoms and
z is an integer from 0 to 6.

Illustrative examples of such compounds are

SUB-CLASS I n-octadecyl 3-(3,5-di-t-butyl-4-hydroxyphenyl)-propionate
n-octadecyl 2-(3,5-di-t-butyl-4-hydroxyphenyl)-acetate
n-octadecyl 3,5-di-t-butyl-4-hydroxybenzoate
n-hexyl 3,5-di-t-butyl-4-hydroxyphenylbenzoate
n-dodecyl 3,5-di-t-butyl-4-hydroxyphenylbenzoate
neo-dodecyl 3-(3,5-di-t-butyl-4-hydroxyphenyl)-propionate
dodecyl β-(3,5-di-t-butyl-4-hydroxyphenyl)-propionate
ethyl α-(4-hydroxy-3,5-di-t-butylphenyl)-isobutyrate
octadecyl α-(4-hydroxy-3,5-di-t-butylphenyl)-isobutyrate
octadecyl α-(4-hydroxy-3,5-di-t-butylphenyl)-propionate

SUB-CLASS II 2-(n-octylthio)ethyl 3,5-di-t-butyl-4-hydroxybenzoate
2-(n-octylthio)ethyl 3,5-di-t-butyl-4-hydroxyphenylacetate
2-(n-octadecylthio)ethyl 3,5-di-t-butyl-4-hydroxyphenylacetate
2-(n-octadecylthio)ethyl 3,5-di-t-butyl-4-hydroxybenzoate
2-(2-hydroxyethylthio)ethyl 3,5-di-t-butyl-4-hydroxybenzoate
2,2'-thiodiethanol bis(3,5-di-t-butyl-4-hydroxyphenyl)acetate
diethyl glycol bis-{3,5-di-t-butyl-4-hydroxyphenyl)-propionate}
2-(n-octadecylthio)ethyl 3-(3,5-di-t-butyl-4-hydroxyphenyl)propionate
2,2'-thiodiethanol-bis-3-(3,5-di-t-butyl-4-hydroxyphenyl)propionate
stearamido N,N-bis-{ethylene 3-(3,5-di-t-butyl-4-hydroxyphenyl)propionate}
n-butylimino N,N-bis-{ethylene 3-(3,5-di-t-butyl-4-hydroxyphenyl)propionate}
2-(2-stearoyloxyethylthio)ethyl 3,5-di-t-butyl-4-hydroxybenzoate
2-(2-hydroxyethylthio)ethyl 7-(3-methyl-5-t-butyl-4-hydroxyphenyl)heptanoate
2-(2-stearoyloxyethylthio)ethyl 7-(3-methyl-5-t-butyl-4-hydroxyphenyl)heptanoate

SUB-CLASS III 1,2-propylene glycol bis-{3-(3,5-di-t-butyl-4-hydroxyphenyl)propionate}
ethylene glycol bis-{3-(3,5-di-t-butyl-4-hydroxyphenyl)propionate}
neopentylglycol bis-{3-(3,5-di-t-butyl-4-hydroxyphenyl)propionate}
ethylene glycol bis-(3,5-di-t-butyl-4-hydroxyphenylacetate)
glycerine-1-n-octadecanoate-2,3-bis-(3,5-di-t-butyl-4-hydroxyphenylacetate)
pentaethylthritol-tetrakis-{3-(3,5-di-t-butyl-4-hydroxyphenyl)propionate}

1,1,1-trimethylol ethane-tris-3-(3,5-di-t-butyl-4-hydroxyphenyl)propionate sorbitol hexa-{3-(3,5-di-t-butyl-4-hydroxy-phenyl)-propionate}

1,2,3-butanetriol tris-{3-(3,5-di-t-butyl-4-hydroxyphenyl)propionate} 2-hydroxyethyl 7-(3-methyl-5-t-butyl-4-hydroxyphenyl)heptanoate 2-stearoyloxyethyl 7-(3-methyl-5-t-butyl-4-hydroxyphenyl)heptanoate 1,6-n-hexanediol-bis{(3′,5′-di-t-butyl-4-hydroxyphenyl)propionate}.

The above phenolic ester stabilizers of sub-classes I, II and III are more fully described in U.S. Pat. No. 3,330,859, Ser. No. 354,464, filed Mar. 24, 1964 and U.S. Pat. No. 3,644,482, Ser. No. 861,475, filed Sept. 26, 1969, respectively.

12. Phenolic compounds having the formula

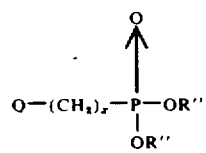

where X is an integer of 1 to 2.

Illustrative examples of such compounds are di-n-octadecyl 3,5-di-t-butyl-4-hydroxybenzyl-phosphonate di-n-octadecyl 3-t-butyl-4-hydroxy-5-methyl-benzyl-phosphonate di-n-octadecyl 1-(3,5-di-t-butyl-4-hydroxy-phenyl)ethanephosphonate di-n-tetradecyl 3,5-di-t-butyl-4-hydroxybenzyl-phosphonate di-n-hexadecyl 3,5-di-t-butyl-4-hydroxybenzyl-phosphonate di-n-docosyl-3,5-di-t-butyl-4-hydroxybenzyl-phosphonate di-n-octadecyl-3,5-di-t-butyl-4-hydroxybenzyl-phosphonate 13. Phenolic compounds having the formula

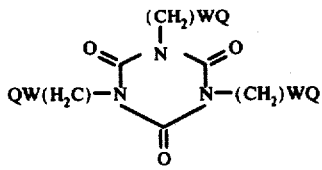

wherein W and Q are as defined above.

Illustrative examples of such compounds are
tris-(3,5-di-t-butyl-4-hydroxybenzyl)isocyanurate
tris-(3-t-butyl-4-hydroxy-5-methylbenzyl)isocyanurate.

The above hydroxyphenylalkenyl isocyanurates are more fully described in U.S. Pat. No. 3,531,483.

The above phenolic hydrocarbon stabilizers are known and many are commercially available.

While any of the above mentioned antioxidants can be useful in combination with the ultraviolet light stabilizers of this invention, the preferred antioxidants consist of the hindered phenols in groups 1, 8, 9, 10, 11, 12 and 13 as mentioned above. The most preferred hindered phenols are those of groups 1, 9, 11, 12 and 13.

The compounds of formula I when m is 1 may be prepared by reacting a compound of the formula

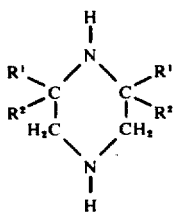

wherein $R^1$ and $R^2$ are as defined previously with an acrylate of the formula

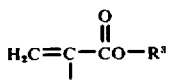

wherein $R^3$ and $R^4$ are as defined previously. The reaction is carried out under a nitrogen atmosphere in a solvent such as toluene, at a temperature of about 90° C.

When m is O, compounds of formula I are prepared by reacting compounds of formula II with α-haloesters of the formula

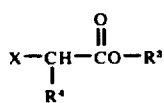

where X is a halogen such as chlorine or bromine and $R^3$ and $R^4$ are as defined previously.

The compounds of formula II are prepared by reducing a compound of the formula

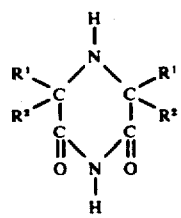

with lithium aluminum hydride.

Compounds of formula II wherein $R^1$ and $R^2$ form a mono cyclic ring with the carbon to which they are attached, may be prepared by the self condensation of a cycloalkyl amino cyanohydrin according to the procedure described by R. Sudo and S. Ichihera, Bull. Chem. Soc. Japan 36 34 (1963) and subsequent hydrolysis as described by E. F. J. Duynstee et al, Recueil de Chemie des Pays - Bas 87 945 (1968). The cycloalkylamino cyanohydrin is formed by the sequential addition of hydrogen cyanide and ammonia to a cycloalkanone as described by W. E. Noland, R. J. Sundberg and M. L. Michaelson, J. Org. Chem. 28 3576 (1963). Although the above references deal specifically with the cycloalkyl case, the procedures therein have been found to be operable in the alkyl case as well, for example, substitution of an alkanone such as acetone for the cycloalkanone such as cyclohexanone in the above procedure.

EXAMPLE 1

1-Aminocyclohexanecarbonitrile

In a 200 ml - 3 necked flask equipped with a stirrer, thermometer, condenser drying tube and gas inlet tube were placed 100 g. (0.8 moles) of cyclohexanone cyanohydrin and the reaction mixture was cooled with an ice bath to 15° C. Gaseous anhydrous ammonia was introduced to the reaction mixture through the gas inlet tube for 6 hours. The reaction was then stoppered and allowed to stand overnight.

The next day anhydrous ammonia was again passed through the reaction mixture for 5 hours at 25° C then dry $N_2$ was passed through the reaction mixture to entrain any excess $NH_3$. The product was then dissolved in 250 ml of benzene, the benzene solution washed two times with 250 ml of water, and the solution dried over anhydrous $Na_2SO_4$. Evaporation of the benzene yielded the product which was a slightly yellow oil.

In a similar manner, 1-aminoisobutyronitrile was prepared by substituting for cyclohexanone cyanohydrin an equivalent amount of acetone cyanohydrin.

EXAMPLE 2

Bis-(1-cyanocyclohexyl)amine

In a 1-necked round bottomed flask equipped with a capillary nitrogen inlet and an air condenser was placed 48.2 g (0.39 moles) of 1-aminocyclohexane carbonitrile. The reaction mixture was heated in an oil bath to bath temperature of 75°–100° over 1 hour and placed under a vacuum of using a water aspirator. The reaction was continued for 24 hours, cooled to room temperature, the vacuum released, and the crystalline mass was triturated with ether and filtered by suction, yielding 19.1 g of white crystals, m.p. 133°–138° C.

In a similar manner, bis(1-cyanoisopropylamine) was prepared by substituting for 1-aminocyclohexane carbonitrile an equivalent amount of 1-aminoisobutyronitrile.

EXAMPLE 3

7,15-diazadispiro[5,1,5,3]hexadecane-14,16-dione

To 406 g of 96% $H_2SO_4$ contained in a 500 ml 3-necked flask equipped with a stirrer, thermometer and powder funnel was added with stirring and cooling, 30.0 g of powdered bis-(1-cyanocyclohexyl)amine over about a 2 hour period. The temperature of the reaction mixture was maintained at 0°–5° C during the addition by using an ice bath. The reaction mixture was allowed to warm to room temperature and to stir overnight. The reaction mixture was then heated to 100° C for one hour then cooled to approximately 15° C and poured onto 3000 g of ice. The aqueous mixture was neutralized to pH 7 by the addition of approximately 800 ml of 10N NaOH. The resulting precipitate was collected by suction filtration, washed well with water, and dried in a vacuum oven, yielding a white powder, m.p. 155°–160° C.

In a similar manner, 2,2,6,6-tetramethyl-3,5-diketopiperazine was prepared by substituting for bis(1-cyanohexyl)amine an equivalent amount of bis(1-cyanoisopropylamine).

EXAMPLE 4

7,15-diazadispiro[5,1,5,3]hexadecane

In a dry 2-liter Morton flask equipped with stirrer, condenser, dropping funnel and $N_2$ inlet was placed a suspension of 6.43 g of lithium aluminum hydride in 380 ml of dry ether. To the suspension was added with stirring under an $N_2$ atmosphere a slurry of 17.6 g (0.070 moles) of 7,15-diazadispiro[5,1,5,3]hexadecane-14,16-dione in 700 ml of ether at such a rate as to maintain gentle reflux. The reaction mixture was allowed to stir for 0.5 hours then heated to boiling under reflux for 21 hours. At the end of this time, the reaction mixture was cooled to 5° C and water was added carefully dropwise until the precipitated solids became white and granular. The solid precipitate was made filterable by the addition of 400 g of anhydrous sodium sulfate. The reaction mixture was then filtered with suction and the collected solids were washed well with additional ether. The filtrate and ether washes were combined, dried over anhydrous sodium sulfate and evaporated under reduced pressure. The residue was taken up in a minimum amount of hot benzene and n-hexane was added at the boil until a precipitate formed. The solution was allowed to stand at room temperature about 48 hours followed by filtration to separate a minor amount of solids which formed. The filtrate was cooled to 5° C for about 14 hours and crystals formed were collected by suction yielding the product as white crystals, m.p. 89°–90° C.

By following the above procedure, and substituting for 7,15-diazadispiro[5,1,5,3]hexadecane14,16-dione an equivalent amount of 2,2,6,6-tetramethyl-3,5-diketopiperazine, there is obtained 2,2,6,6-tetramethylpiperazine.

EXAMPLE 5

Methyl-β-(15,7,15-diazadispiro[5,1,5,3]hexadecane)-propionate

In a 100 ml flask equipped with a stirrer, thermometer, condenser and $N_2$ inlet was placed 8.9 g (0.04 moles) of 7,15-diazadispiro[5,1,5,3]hexadecane and 20 ml of methyl acrylate. The reaction mixture was heated at reflux for 24 hours. The apparatus was modified for distillation and the excess methyl acrylate distilled from the reaction mixture. The residue was taken up in hot hexane, cooled, and the crystals which formed were removed by suction filtration. The filtrate was evaporated giving 9.2 g of the desired product as a clear liquid.

By following the above procedure, and substituting for 7,15-diazadispiro[5,1,5,3]hexadecane an equivalent amount of 2,2,6,6-tetramethylpiperazine, there is obtained methyl-β-(4{2,2,6,6-tetramethylpiperazino}) propionate.

EXAMPLE 6

By essentially following the procedure of Example 5 and substituting for the reactants used, i.e., 7,15-diazadispiro[5,1,5,3]hexadecane and methacrylate, an equivalent amount of the following reactants:

a. 7,15-diazadispiro[5,1,5,3]hexadecane + n-dodecyl acrylate b. 7,15-diazadispiro[5,1,5,3]hexadecane + isobutylacrylate c. 7,15-diazadispiro[5,1,5,3]hexadecane + n-octadecyl acrylate d. 2,2,6,6-tetramethylpiperazine + n-lauryl acrylate
e. 7,15-diazadispiro[5,1,5,3]hexadecane + methylmethacrylate
f. 2,2,6,6-tetrameth6lpiperazine + methyl metaerylate there is respectively obtained the following compounds a. n-dodecyl-β-(15{7,15-diazadispiro[5,1,5,3]hexadecane}) propionate b. isobutyl-β-(15{7,15-diazadispiro[5,1,5,3]hexadecane}propionate c. n-octadecyl-β-(15{7,15-diazadispiro[5,1,5,3]hexadecane)}propionate d. n-lauryl-β-{4-(2,2,6,6-tetramethylpiperazino}propionate); a liquid at 25° C e. methyl-β-(15{7,15-diazadispiro[5,1,5,3]hexadecane})-α-methylpropionate f. methyl-β-{4-(2,2,6,6-tetramethylpiperazino}α-methyl propionate; a liquid at 25° C

EXAMPLE 7

Methyl α-(4-{2,2,6,6-tetramethylpiperazine}) acetate

In a 300 ml flask equipped with a stirrer, thermometer, condenser, dropping funnel and N₂ inlet is placed 6.61 g (0.05 moles) of 2,2,6,6-tetramethylpiperazine in 100 ml of dry dimethylformamide (DMF). To the solution is added dropwise, with stirring, at room temperature a solution of 7.65 g (0.05 moles) of methyl-α-bromoacetate in 50 ml of dry DMF. The reaction mixture is allowed to stir for 5 hours at room temperature and then poured into 300 ml of water. The aqueous solution is made strongly basic with 40 percent aqueous sodium hydroxide and extracted with chloroform (3 × 300 ml). The chloroform extracts are dried over anhydrous Na₂SO₄ and evaporated under reduced pressure, yielding the desired material, methyl-α-(4-{2,6,6,6-tetramethylpiperazino})acetate.

By following the above procedure and substituting for the methyl-α-bromoacetate an equivalent amount of:

a. ethyl α-bromopropionate
b. n-octyl α-chloroacetate
c. n-octadecyl α-bromoacetate there is respectively obtained the following compounds:

a. ethyl-α-(4-{2,2,6,6-tetramethylpiperazino}) propionate b. n-octyl-α-(4-{2,2,6,6-tetramethylpiperazino}) acetate c. n-octadecyl-α-(4-{2,2,6,6-tetramethylpiperazino}) acetate

EXAMPLE 8

By essentially following the procedure of Example 7 and substituting for the reactants used, i.e., 2,2,6,6-tetramethylpiperazine and methyl-α-bromoacetate, an equivalent amount of the following reactants:

a. 7,15-diazadispiro[5,1,5,3]hexadecane + n-dodecyl α-chloroacetate b. 7,15-diazadispiro[5,1,5,3]hexadecane + n-hexyl α-bromopropionate c. 7,15-diazadispiro[5,1,5,3]hexadecane + ethyl α-chloroacetate there is respectively obtained the following compounds:

a. n-dodecyl-α-(15{7,15-diazadispiro[5,1,5,3]hexadecane})acetate b. n-hexyl-α-(15{7,15-diazadispiro[5,1,5,3]hexadecane})propionate c. ethyl-α-(15{7,15-diazadispiro[5,1,5,3]hexadecane})acetate.

EXAMPLE 9

Artificial Light Exposure Test

Deterioration of most polymers caused by ultraviolet light is so slow at ambient temperatures, even in the absence of stabilizers, that testing of the effects of stabilizers generally must be conducted either at higher temperatures or in an accelerated artificial light exposure device in order to yield results in a convenient period of time. The tests conducted on polymers using an artificial light exposure device is described below:

a. Sample Preparation 5 mil Film - Unstabilized polypropylene powder (Hercules Profax 6501) is thoroughly blended with the indicated amounts of additives. The blended material is then milled on a two roll mill for 5 minutes at 182° C. The milled sheet is then compression molded at 220° C into 5 mil thick film under a pressure of 175 psi and water cooled in the press.

b. Testing Method

This test is conducted in a FS/BL unit, basically of the American Cyanamid design, which consists of 40 tubes of alternating fluorescent sunlamps and black lights (20 of each). The 5 mil sample film which are mounted on 3 inches × 2 inches IR card holders with ¼inch × 1 inch windows are placed on a rotating drum 2 inches from the bulbs in the FS/BL unit. The time in hours is noted for the development of 0.5 carbonyl absorbance units as determined on an Infrared Spectophotometer. The development of carbonyl functional groups in the polymer is proportional to the amount of degradation caused by the ultraviolet light exposure.

The test results reported below were obtained according to the procedures described above. The amounts of the additives are expressed in weight per cent based on the weight of the polymer.

TABLE I

| Formulation* | Time in Hours to .5 Carbonyl Absorbance Units |
|---|---|
| .5% methyl-β-(15{7,15-diazadispiro[5,1,5,3] hexadecane})propionate | 785 |
| *Control | 180 |

*The sample tested and the control contains 0.2% of (di-octadecyl(3,5-di-t-butyl-4-hydroxybenzyl)phosphonate which is an antioxidant which prevents oxidative degradation of polypropylene during processing.

Other hindered phenolic antioxidants may be used in place of di-octadecyl(3,5-di-t-butyl-4-hydroxybenzyl)-phosphonate in the above mentioned composition for example, di-n-octadecyl α-(3-t-butyl-4-hydroxy-4-methylbenzyl)malonate, 2,4-bis(n-octylthio)-6-(3,5-di-t-butyl-4-hydroxyaniline)-1,3,5-triazine, octadecyl 3-(3',5'-di-t-butyl-4'-hydroxyphenyl)propionate, pentaerythritol-tetrakis 3-(3,5-di-t-butyl-4-hydroxyphenyl)-propionate tris-(3,5-di-t-butyl-4-hydroxybenzyl-)isocyanurate, respectively.

EXAMPLE 10 a. A composition comprising acrylonitrilebutadienestyrene terpolymer and 1 percent by weight of methyl-β-(15{7,15-diazadispiro[5,1,5,3]hexadecane}) propionate resists embrittlement due to exposure to ultraviolet light longer than one which does not contain the stabilizers.

b. A composition comprising polyurethane prepared from toluene diisocyanate and alkylene polyols and 1.0 percent by weight of n-dodecyl-β-(15{7,15-diazadispiro [5,1,5,3]hexadecane})propionate is more stable to sunlight, fluorescent sunlamps, black lights and fluorescent lights than the unformulated polyurethane.

c. A composition comprising a polycarbonate prepared from bisphenol-A and phosgene and 1 percent by weight of isobutyl-β-(15{7,15-diazadispiro[5,1,5,3] hexadecane})propionate resists discoloration due to exposure to ultraviolet light longer than one which does not contain the stabilizer.

d. A composition comprising a polyester (polyethyleneterephthalate) and 0.2 percent by weight of n-octadecyl-β-(15{7,15-diazadispiro[5,1,5,3]hexadecane})propionate resists discoloration due to exposure to ultraviolet light longer than one which does not contain the stabilizer.

e. A composition comprising polymethylmethacrylate and 0.25 percent by weight of n-lauryl-β-(4{2,2,6,6-tetramethylpiperazino})propionate resists discoloration due to exposure to ultraviolet light longer than one which does not contain the stabilizer.

EXAMPLE 11 a. A stabilized linear polyethylene is prepared by incorporating therein 0.5 percent by weight of n-dodecyl-α-(15{7,15-diazadispiro[5,1,5,3]hexadecane}) propionate. The stabilized compositions resist embrittlement due to exposure to ultraviolet light longer than one which does not contain the stabilizer.

b. A stabilized polyamide (nylon 6,6) is prepared by incorporating therein 0.1 percent of n-lauryl - β-(4{2,2,6,6-tetramethylpiperazino})propionate. The light stability of the stabilized composition is superior to that of an unstabilized polyamide.

c. A stabilized polyphenylene oxide polymer (prepared by polymerizing 2,6-dimethylphenol) is prepared by incorporating therein 0.5 percent by weight of methyl-α-(4{2,2,6,6-tetramethylpiperazino})acetate. The stabilized compositions resist embrittlement due to exposure to ultraviolet light longer than on does not contain the stabilizer.

d. A stabilized crystalline polystyrene is prepared by incorporating therein 0.1 percent by weight of methyl-β-(15{7,15-diazadispiro[5,1,5,3]hexadecane}) α-methylpropionate. The stabilized compositions resist embrittlement due to exposure to ultraviolet light longer than one which does not contain the stabilizer.

EXAMPLE 12

High impact polystyrene resin containing elastomer (i.e., butadiene-styrene) is stabilized against loss of elongation properties due to exposure to ultraviolet light by incorporation of 0.3 percent by weight of n-octadecyl-β-(15{7,15-diazadispiro[5,1,5,3]hexadecane})propionate.

The unstabilized resin is dissolved in chloroform and the stabilizer then added, after which the mixture is cast on a glass plate and the solvent evaporated to yield a uniform film which, upon drying, is removed and cut up, and then pressed for 7 minutes at a temperature of 163° C and a pressure of 2,000 pounds per square inch into a sheet of uniform thickness (25 mil). The sheets are then cut into strips approximately 4 × 0.5 inches. A portion of these strips is then measured for percent of elongation in the Instron Tensile Testing Apparatus (Instron Engineering Corporation, Quincy, Massachusetts). The remaining portion of the strips are placed in an FS/BL chamber according to Example 6 (b) except that the samples are mounted and white cardboard stock and the time to 50 percent reduction in elongation is measured. The stabilized polystyrene resin retains its elongation property longer than the unstabilized resin.

Similar results are obtained when an equivalent amount of the following stabilizers are used in place of the above mentioned stabilizer.

a. 0.1 percent by weight of methyl-β(15{7,15-diazadispiro[5,1,5,3]hexadecane})propionate b. 0.2 percent by weight of methyl-β-(4{2,2,6,6-tetramethylpiperazino})propionate c. 0.1 percent by weight of n-lauryl-β-(4{2,2,6,6-tetramethylpiperazino})propionate d. 0.5 percent by weight of n-dodecyl-β-(15{7,15-diazadispiro[5,1,5,3]hexadecane})propionate e. 1 percent by weight of isobutyl-β-(15{7,15-diazadispiro[5,1,5,3]hexadecane})propionate f. 0.5 percent by weight of n-octyl-α-(4-{2,2,6,6-tetramethylpiperazino})acetate g. 0.1 percent by weight of methyl-β-(15{7,15-diazadispiro[5,1,5,3]hexadecane})-α-methyl propionate h. 0.2 percent by weight of n-octadecyl-α-(4-{2,2-6,6-tetramethylpiperazino})acetate i. 0.5 percent by weight of n-hexyl-α-(15{7,15-diazadispiro[5,1,5,3]hexadecane})propionate j. 0.2 percent by weight of ethyl-α-(15{7,15-diazadispiro[5,1,5,3]hexadecane})acetate.

Antioxidants may also be incorporated into each of the above mentioned compositions, for example di-n-octadecyl-α,α'-bis(3,4-butyl-4-hydroxy-5-methylbenzyl) malonate, 2,4-bis(4-hydroxy-3,5-di-t-butylphenoxy)-6-(noctylthioethylthio)-1,3,5-triazine, 2,4-bis(3,5-di-t-butyl-hydroxyphenoxy)-6-(n-octylthio)-1,3,5-triazine, di-n-octadecyl 3(3',5'-di-t-butyl-4-hydroxyphenyl)propionate, respectively.

What is claimed is:

1. A composition of matter stabilized against ultraviolet deterioration which comprises a synthetic organic polymer normally subject to ultraviolet deterioration containing from 0.05% to 5% by weight of the polymer of a stabilizing compound of the formula

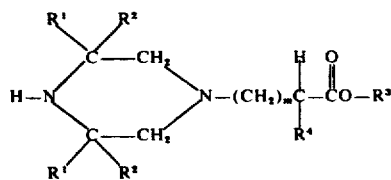

wherein
R¹ and R² are methyl or together with the carbon to which they are bound form a mono-cyclic ring system having 5 or 6 carbon atoms;
R³ is an alkyl group of from 1 to 20 carbon atoms;
R⁴ is hydrogen or methyl, and
m is 0 or 1.

2. A composition of claim 1 wherein the stabilizing compound has the formula

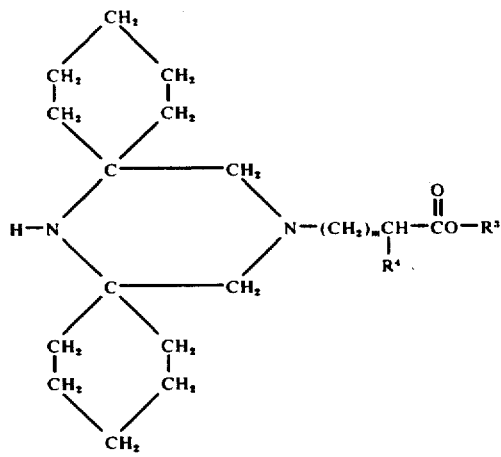

wherein R³ is an alkyl group of from 1 to 20 carbon atoms; R⁴ is hydrogen and m is 0 or 1.

3. A composition of claim 2 wherein R⁴ is hydrogen; and m is 0 or 1.

4. A composition of claim 1, wherein R¹ and R² are each a methyl group; R³ is an alkyl group of from 1 to 20 carbon atoms; R⁴ is hydrogen and m is 0 or 1.

5. A composition of claim 4 wherein R⁴ is hydrogen and m is 0.

6. A composition of claim 1 wherein the stabilizing compound is methyl-β-(15{7,15-diazadispiro[5.1.5.3-]hexadecane})propionate.

7. A composition of claim 1 wherein the stabilizing compound is methyl-β-(4{2,2,6,6-tetramethylpiperazino})propionate.

8. A composition of claim 1 wherein the stabilizing compound is n-dodecyl-β-(15{7,15-diazadispiro[5.1.5.3]hexadecane})propionate.

9. A composition of claim 1 wherein the stabilizing compound is n-octadecyl-β-(15{7,15-diazadispiro[5.1.5.3]hexadecane})propionate.

10. A composition of claim 1 wherein the stabilizing compound is methyl-β-(15{7,15-diazadispiro[5.1.5.3-]hexadecane})-α-methyl-propionate.

11. A composition of claim 1 wherein the stabilizing compound is methyl-α-(4-{2,2,6,6-tetramethylpiperazino})acetate.

12. A composition of claim 1 wherein the stabilizing compound is ethyl-α-(4-{2,2,6,6-tetramethylpiperazino})propionate.

13. A composition of claim 1 wherein the stabilizing compound is n-octadecyl-α-(4-{2,2,6,6-tetramethylpiperazino})acetate.

14. A composition of claim 1 wherein the stabilizing compound is n-dodecyl-α-(15{7,15-diazadispiro[5.1.5.3]hexadecane})propionate.

15. A composition of claim 1 wherein the stabilizing compound is n-lauryl-β-(4{2,2,6,6-tetramethylpiperazino})propionate.

16. A composition of claim 1 stabilized against ultraviolet deterioration which comprises a synthetic organic polymer normally subject to ultraviolet deterioration containing a stabilizing amount of a hindered phenolic antioxidant and from about 0.005 to 5 percent by weight of the polymer of a stabilizing compound of claim 1.

17. A composition of claim 16 wherein the polymer is a polyolefin.

18. A composition of claim 17 wherein the polyolefin is polypropylene.

19. A composition of claim 17 wherein the hindered phenolic compound is selected from n-octadecyl 3-(3,5-di-t-butyl-4-hydroxyphenyl) propionate, di-n-octadecyl(3,5-di-t-butyl-4-hydroxybenzyl)phosphonate, pentaerythritol-tetrakis[3-(3,5-di-t-butyl-4-hydroxyphenyl)propionate], and tris-(3,5-di-t-butyl-4-hydroxybenzyl)isocyanurate.

20. A composition of claim 17 wherein the antioxidant is di-n-octadecyl(3,5-di-t-butyl-4-hydroxybenzyl)-phosphonate.

21. A composition of claim 17 wherein the stabilizing compound is methyl-β-(15{7,15-diazadispiro[5.1.5.3-]hexadecane})propionate.

* * * * *